Figure 1:
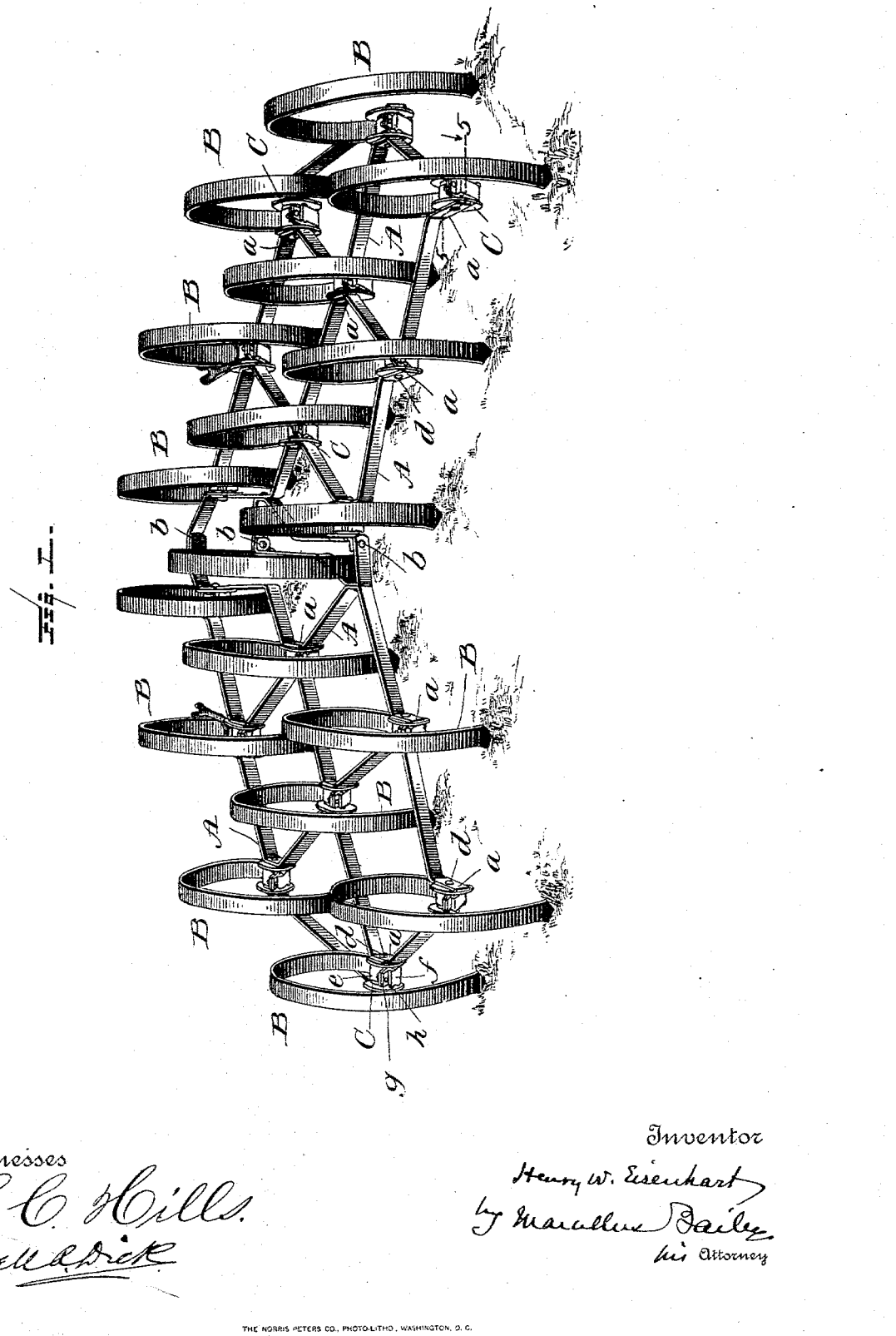

(No Model.) 2 Sheets—Sheet 1.

H. W. EISENHART.
SPRING TOOTH HARROW.

No. 490,226. Patented Jan. 17, 1893.

Witnesses
L. C. Hills
Ewell A. Dick

Inventor
Henry W. Eisenhart
by Marcellus Bailey
his Attorney (No Model.) 2 Sheets—Sheet 2.
H. W. EISENHART.
SPRING TOOTH HARROW.
No. 490,226. Patented Jan. 17, 1893.
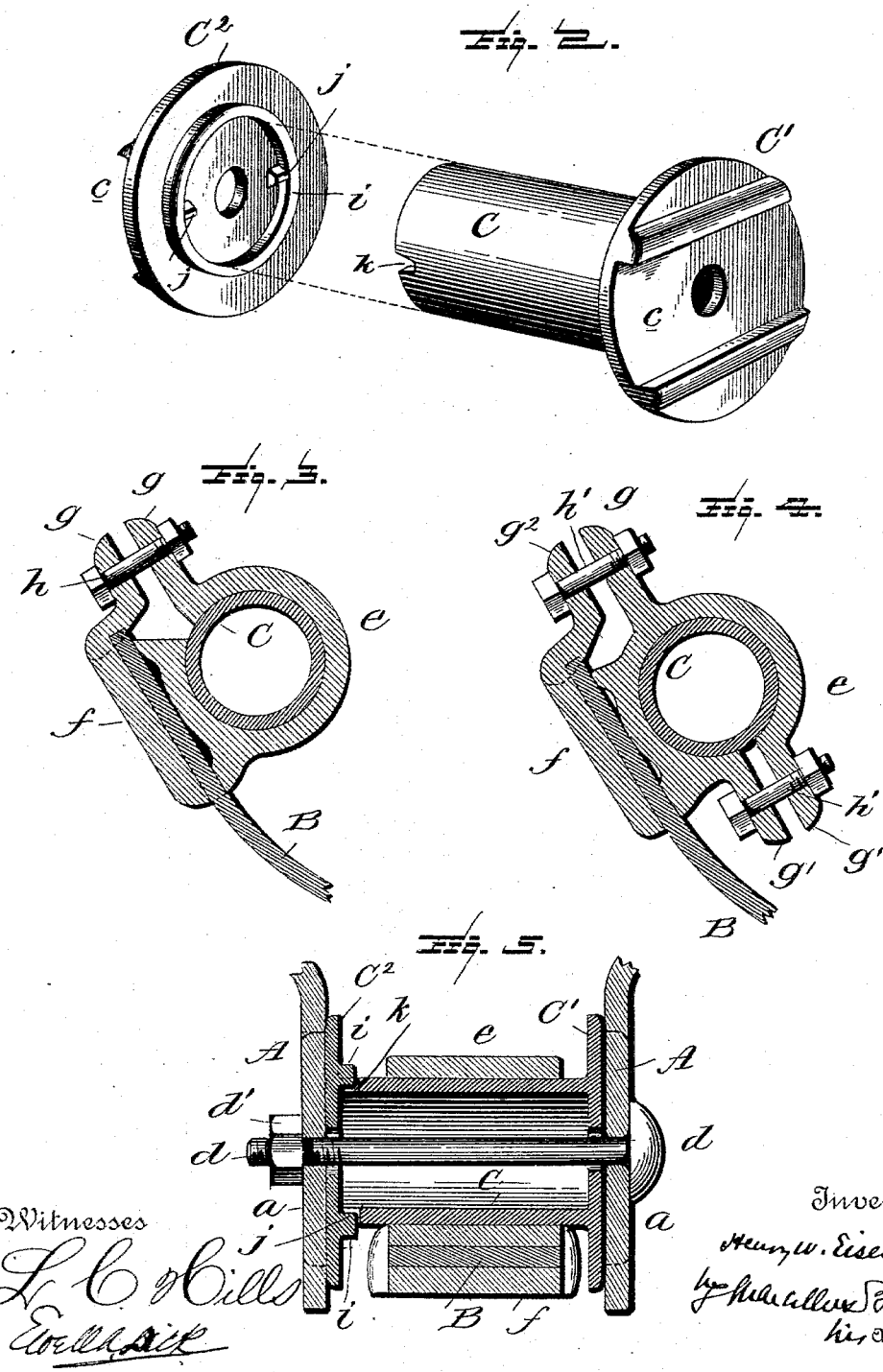

UNITED STATES PATENT OFFICE.

HENRY W. EISENHART, OF YORK, PENNSYLVANIA, ASSIGNOR TO ARTHUR B. FARQUHAR, OF SAME PLACE.

SPRING-TOOTH HARROW.

SPECIFICATION forming part of Letters Patent No. 490,226, dated January 17, 1893.

Application filed January 26, 1892. Serial No. 419,332. (No model.)

*To all whom it may concern:*

Be it known that I, HENRY W. EISENHART, of the city of York, in the State of Pennsylvania, have invented a new and useful Improvement in Spring-Tooth Harrows, of which the following is a specification.

The harrow in which my invention is comprised is one of that kind in which the harrow frame is composed of metal straps of zig zag form and is combined with harrow teeth located between the contiguous parallel faces of adjoining straps.

I have represented on the accompanying drawings a harrow embodying my improvements.

I shall first describe the harrow and will then point out those features of it which I believe to be new.

In the drawings Figure 1 is a perspective view of the complete harrow. Fig. 2 is a view of one of the thimbles or spools which are interposed between the parallel faces of adjoining zig zag frame-straps. Fig. 3 is a vertical cross section of one of the thimbles with a tooth holder and spring tooth secured thereon. Fig. 4 is a like section with a modified form of tooth holder. Fig. 5 is a section through one of the spools and the adjacent zig zag bars, on line 5—5 Fig. 1.

The harrow is of the type which is known as the butterfly harrow. It is approximately heart shaped or V shaped in general outline, and is composed of two sections hinged together centrally and longitudinally by horizontal hinge bolts $b$. The frame of each section is composed of zig zag straps or bars A having short faces $a$ which are in line with the draft; and the spring harrow teeth B are located between the parallel faces $a$ of adjoining straps. The frame straps A at their faces $a$ are held together by spools C, the heads C', $C^2$ of which are provided with exterior horizontal grooves $c$ in which the parts $a$ of the straps are seated thus preventing any movement of the spools relatively to the straps. The straps and spools are held tightly together by bolts $d$ and nuts $d'$. The bolts pass through the spools and the straps, and the nuts draw and hold the parts rigidly together. The spools serve not only to space the straps, but also as seats for the teeth or the tooth holders.

The holder shown in Fig. 3 is one that is illustrated in Letters Patent No. 465,173 of December 15, 1891, consisting of a split clamping ring $e$ encircling the spool, a clamping plate $f$ fast at one end to the ring and having between it and the part of the ring opposite which it comes a socket or seat for receiving the end of the tooth—the ring and the clamping plate being provided at their opposite free ends with ears $g$ through which passes a bolt $h$ whereby at one and the same operation the tooth will be clamped in its holder and the holder itself will be clamped on the spool. To mount this holder, it must be placed upon the spool before the latter is secured in the harrow frame; and at least one of the spool heads must be made detachable, otherwise the ring $e$ (being of less diameter than the heads) could not be fitted upon the body of the spool. To this end the head $C^2$ for example is made separate from the spool as shown plainly in Fig. 2. The inner face of this head has an annular flange $i$ forming a seat into which the end of the spool snugly fits when the head is applied to it. In this way the spool when secured in the frame is supported equally at both ends against lateral direct thrust or strain. To support it at this end against torsional strain also, the head on its inner face is provided with inwardly projecting lugs $j$ adapted to enter and fit into notches $k$ in the adjoining end of the spool.

In the holder shown in Fig. 3, both the tooth and the holder must be loosened whenever it is desired to remove or adjust either one of them. In Fig. 4 however is represented a modified form of holder, in which either the tooth or the holder can be loosened without loosening or disturbing the adjustment of the other. In this form of holder the clamping ring $f$ is split on one side as before. Its adjoining ends however are each provided with an ear $g'$, which by a bolt $h'$ are drawn together so as to clamp the ring upon the spool. This clamping action however is exercised upon the ring alone, and has no effect upon the tooth. The clamping plate $f$ occupies the same position here as in Fig. 3, and the tooth is held as before in a socket seat between it and the ring; but in order to do this an additional ear $g^2$ is cast or otherwise formed on the ring so as to come opposite the ear $g$ of the clamping plate, and the bolt $h$ passes through the two ears and by drawing them together fastens the tooth. Thus the clamping of the holder on the spool is effected by one set of devices $g'$, $h'$, and the clamping of the tooth to the holder is effected by another set of devices $g$, $g^2$, $h$, each set being capable of acting independently of the other, and the clamping action by which the tooth is secured to the holder being independent of that by which the holder is secured on the spool and vice versa.

Having now described in detail the construction of the harrow, I desire to say, with a view to distinguish what is old from what I believe to be new, that I am aware that a harrow having its frame composed of zig zag bars or straps such as shown herein with their parallel short faces in the line of the draft, and teeth mounted in and secured to the frame at these points is not new. This feature is disclosed in British Patents No. 739 of the year 1865, and No. 498 of the year 1874; and in these patents the teeth are located between the parallel parts $a$ of the frame, and are secured by the same devices which hold together the frame straps at these points. I am also aware that a butterfly harrow composed of sections hinged together as described and approximately heart shaped or V shaped in general outline is not new. Such harrows, having their frames made either of straight bars crossing one another, or of zig-zag bars such as disclosed in the British patents above referred to, are illustrated in Letters Patent No. 95,458 of October 5, 1869, No. 338,176 of March 16, 1886, No. 402,079 of April 23, 1889, No. 450,964 of April 21, 1891, and many others which might be named. I am also aware that individually adjustable spring teeth are old and public property. I claim none of these things.

I am further aware that spring teeth have been adjustably secured between the faces $a$ of a zig-zag strap harrow frame, but I know of no case in which the tooth or tooth holder has been secured upon a headed spool interposed between the straps, one of the heads of the spool being removable to permit the holder to be put on and removed from the body of the spool.

From the foregoing it will be seen that what there is of novelty in the harrow, resides in the spool and its combination with the harrow teeth and the frame; and in the specific form of holder shown in Fig. 4 of the drawings.

What therefore I claim and desire to secure by Letters Patent is:

1. The spool provided with a removable head in combination with the frame straps, the bolt for holding the spool and straps together, the tooth, and the tooth holder having a clip ring which fits and is secured on the body of the spool, substantially as hereinbefore set forth.

2. The spring tooth holder consists of the split clamping ring and means for drawing its ends together, the clamping plate fast at one end to the ring and having between it and the ring a socket to receive the end of the tooth, and means, independent of and separate from the ring clamping or closing devices, for drawing the free end of the clamp plate toward the tooth and the ring, substantially as and for the purposes set forth.

In testimony whereof I affix my signature in presence of two witnesses.

HENRY W. EISENHART.

Witnesses:
JOHN W. BRANT,
F. J. EVANS.